Nov. 28, 1944.   W. C. BAILEY   2,363,492

PROCESS OF MAKING BALANCED LAMINATED PANELS

Original Filed June 27, 1941

Inventor

William C. Bailey

By Reynolds & Beach

Attorneys

Patented Nov. 28, 1944

2,363,492

UNITED STATES PATENT OFFICE 2,363,492

PROCESS OF MAKING BALANCED LAMINATED PANELS

William C. Bailey, Seattle, Wash., assignor to United States Plywood Corporation, Seattle, Wash., a corporation of New York Original application June 27, 1941, Serial No. 400,115. Divided and this application March 6, 1942, Serial No. 433,624

5 Claims. (Cl. 144—309)

The present invention relates to a process for producing a plywood panel of the type disclosed in the patent to Donald Deskey, No. 2,286,068, issued June 9, 1942. This application is divided from application Serial No. 400,115, filed June 27, 1941, to the panel.

Such panels, supplied for the most part in the form of three-ply wallboards made of rotary cut Douglas fir, are striated, that is, they are provided with a multitude of grooves extending generally lengthwise of the grain, in the exposed surface of the outer ply. These grooves are each of random depth, as compared to adjacent grooves, though each groove may be of substantially uniform depth throughout its length, but the panel surface is provided with a multiplicity of relatively deep grooves extending nearly to the glue line, and these deep grooves are sufficiently closely spaced and sufficiently distributed over the entire face of the panel so that stresses transversely of the grain, caused by shrinkage or swelling, are not permitted to accumulate across the width of the panel. In this way shrinkage or swelling of the panel as a whole, and checking and cracking of the face ply, are substantially completely avoided.

It has been found, however, that certain other and undesirable effects are produced by this striating of the outer face, and particularly when normal wallboard panels are thus striated. In normal wallboard panels the face plies, as laid up, are of the same thickness. While transverse shrinkage and swelling are almost completely eliminated by striating, the grooving, particularly if the two face plies be of substantially equal initial thickness, weakens the grooved face ply to an extent such that the compression stresses that accumulate in the ungrooved inner face ply may cause the edges of the panel to curl upwardly; that is to say, the grooved ply may become cupped or concaved, and its edges may curl away from the support. This is not true in all cases, for it depends on the drying of the veneer, and on climatic conditions, but it occurs with sufficient frequency that it is desirable to take steps to insure its prevention.

By reason of such edge-curling even though there is no appreciable shrinking of the panel as a whole, there is visible certain edge separation between two adjoining panels, and it is to prevent this edge separation and this edge curling of the panels, particularly in such striated panels, that the present invention is directed.

The present invention concerns primarily the process of producing such a panel, so formed and so striated that it tends to lie flat and does not curl at the edges, and of neutralizing or balancing the stresses therein in such a way that this edge curling is eliminated or prevented.

The principles which distinguish this invention, and its relation to the invention of the Deskey patent referred to above, will appear as this specification progresses, and will be particularly defined by the claims which terminate the same.

The accompanying drawing illustrates, in a somewhat exaggerated fashion, the principles of the present invention.

Figure 1:
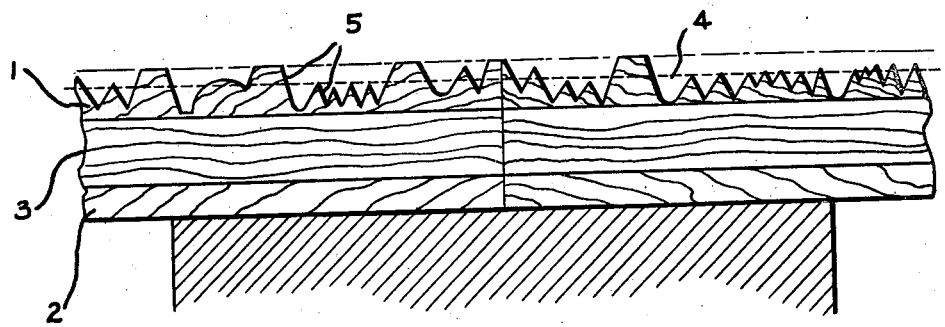
Figure 1 is an edge view of the abutting edges of two panels, showing the relationship of the plies and of the striations, and the relative position of such panels when assembled in a wall.

As has been explained, panels were grooved according to the Deskey disclosures, which panels were normal three-ply wall board panels of rotary-cut fir veneer, wherein the cross core and the longitudinally grained inner and outer face plies were of substantially equal thickness. It was found that while such grooving would prevent any appreciable shrinkage or swelling of the panel as a whole, transversely of the grain, the panel edges would still tend to curl outwardly sometimes, that is, away from the support, so that the striated ply became cupped or concaved. It might have been thought that the striations, by relieving the accumulation of transverse tensional stresses in the plane of the ply would prevent any such curling tendency, but I have discovered that, on the contrary, the failure to relieve the compressional stresses in the inner face ply, and the failure to balance transverse stresses in the opposite face plies, caused this curling.

To relieve this tendency to curl, therefore, I purposely and intentionally unbalance the inner and outer face plies initially, by making the inner face ply the thinner, and the outer face ply the thicker, and then in the process of grooving the thicker outer face ply its effective thickness is reduced substantially to the equivalent of the thickness of the thinner inner face ply. In this way the transverse compressional stresses in the plane of the striated outer face ply, which by reason of its greater thickness would initially exceed those in the thinner inner face ply, are balanced and equalized with those of the inner face ply, and the result is that with these stresses balanced one against the other there is no appreciable cupping or curving one way or the other, and edge curling is prevented. Such a result will largely be achieved if the striating is concentrated adjacent the edges, but preferably it extends entirely across the width of the face.

Curling can be further resisted by making the cross core somewhat thicker in proportion to the face plies, and I prefer that the panel be so constructed. In other words, the core ply 3 is preferably the thickest. In a wall board panel constructed in accordance with the principles of this invention the core ply is, for example, ⅛ of an inch in thickness. The inner face ply 2 is the thinnest of the three, and in the example chosen is 1/16 of an inch, whereas the outer face ply 1 is intermediate in thickness between the other two, and in the example given is initially 1/16 of an inch thick. However, by the striating its effective thickness is reduced so that its average thickness, indicated by the dash line 4, is substantially equal to the thickness of the inner face ply 2. In any event the stresses transversely of the grain, which are prevented from accumulating by the grooving in the outer face ply 1, are substantially equalized by this variation in the initial thickness, and by the actual or effective removal of wood through the grooving, until these stresses are substantially equalized with the corresponding stresses in the inner face ply 2.

The process, then, consists primarily in laying up an initially unbalanced panel, that is, one wherein the two face plies are of unequal thickness, or which are unequal to the extent of having different inherent transverse stresses at their edges, and then of striating or grooving the thicker or more greatly stressed face ply to reduce it to an effective thickness which equals the thickness of the opposite, ungrooved face ply. Of course, if the plywood panel has previously been thus unbalanced, there remains only the grooving to be done, yet the previous laying up of the unbalanced panel, for later balancing by grooving, constitutes part of the process. The grooving can be accomplished in several ways, as by actual gouging out and removal of material, according to the disclosure of the Deskey patent (as is preferred), or by crushing in of grooves by pressure rollers or dies, or the like. Primarily the process concerns the striating back into balance, and the equalization of stresses by such striating, in two opposite face plies which by reason of a difference in their initial relative thickness, hardness, composition, or other quality, would otherwise be or become unbalanced, and which would by such unbalanced stresses transversely, in the edge zones, tend to curl at their edges.

Figure 2:
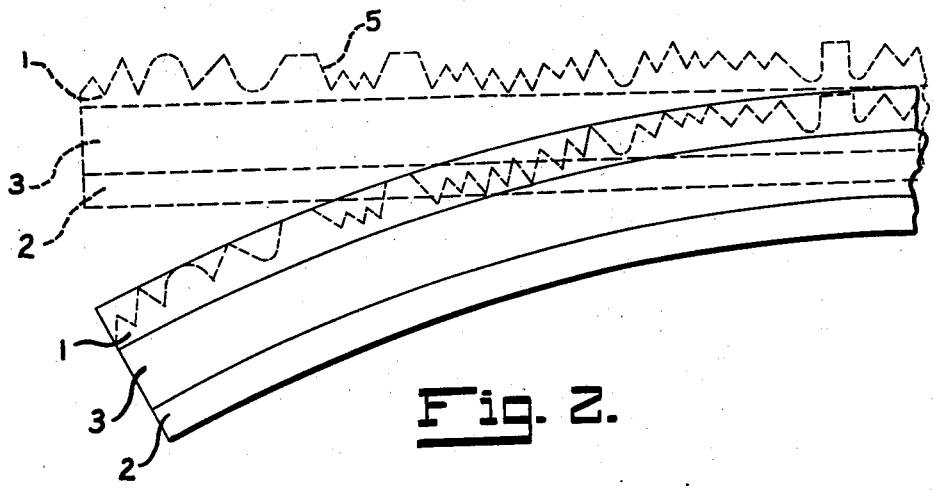
Figure 2 is an edge view of a single panel, showing how the same might curl if not constructed in accordance with the present invention, and how it lies flat when arranged according to the present inventiton.

A panel which otherwise would tend to curl in the manner indicated in full lines in Figure 2, due to its inherent unbalance, is balanced by striating as indicated at 5, and now exhibits no tendency to curl, but lies flat as shown in dash lines, Figure 2. In this manner the advantages of striating, in eliminating edge separation, checking, and cracking, and in affording a pleasing visual effect, are capable of achievement, yet without introducing the resultant disadvantage of edge curling. None of the advantages are lost, but the ensuing disadvantage is overcome.

What I claim as my invention is:

1. The process of equalizing stresses and thus preventing edge-curling in plywood panels of the type that is grooved longitudinally of the grain over one face ply, comprising laying up the panel with face plies having their grain extending in the same direction, said plies being initially of different thickness, and forming closely spaced grooves in the thicker of such face plies lengthwise of its grain over a sufficient width and to a depth sufficient to reduce its average thickness to substantially equal that of the thinner face ply, to equalize the stresses in the grooved ply, transversely of its grain, with similar stresses in the opposite thinner but ungrooved face ply.

2. The process of equalizing stresses and thus preventing edge-curling and transverse shrinkage in plywood panels, comprising completing a panel with one face ply thicker than the other, and grooving such thicker face ply, lengthwise of its grain, the grooves being closely spaced over the surface, and of such depth as to reduce the average thickness of such thicker face ply substantially to the same thickness as the thinner face ply, to minimize the accumulation of transverse stresses in the plane of such grooved ply, and to equalize these stresses with similar stresses in the plane of the thinner ungrooved face ply.

3. The process of equalizing stresses and thus preventing edge-curling and transverse shrinkage in plywood panels, comprising laying up the panel with a thick cross core, a thinner outer face ply, and a still thinner inner face ply, and in grooving the thicker face ply, lengthwise of its grain, with a multitude of closed spaced grooves distributed over its surface, various grooves being of different depths as related to other grooves, but each groove being of substantially uniform depth from end to end, grooves extending deeper than the majority of the grooves and of a depth to cut nearly through the ply being sufficiently closely spaced to localize transverse stresses and prevent their accumulation over a material width of such face ply, and thus to minimize shrinkage and swelling in the plane of the grooved ply, and at the same time to reduce the aggregate of transverse stresses in the grooved face ply to a value substantially equal to their aggregate value in the ungrooved inner face ply, and thus to balance opposed edge-curling tendencies.

4. The process of equalizing stresses and thus preventing edge-curling in plywood panels of the type that is grooved longitudinally of the grain over one face ply, comprising laying up the panel with face plies having their grain extending in the same direction, said plies being initially of different thickness, and forming closely spaced grooves in the thicker of such face plies lengthwise of its grain over a sufficient width and to a depth sufficient to have the residual thickness in certain of the grooves of the grooved face ply less than the thickness of the ungrooved face ply, the average residual thickness of the entire grooved ply being substantially equal to the thickness of the ungrooved ply, to equalize the stresses in the grooved ply, transversely of its grain, with similar stresses in the opposite thinner but ungrooved face ply.

5. The process of equalizing stresses and thus preventing edge-curling and transverse shrinkage in plywood panels, comprising completing a panel with one face ply thicker than the other, and grooving such thicker face ply, lengthwise of its grain, the grooves being closely spaced over the surface, and of such depth as to have the residual thickness in certain of the grooves of the grooved face ply less than the thickness of the ungrooved face ply, the average residual thickness of the entire grooved ply being substantially equal to the thickness of the ungrooved ply, to minimize the accumulation of transverse stresses in the plane of such grooved ply, and to equalize these stresses with similar stresses in the plane of the thinner ungrooved face ply.

WILLIAM C. BAILEY.

CERTIFICATE OF CORRECTION.

Patent No. 2,363,492.  November 28, 1944.

WILLIAM C. BAILEY.

It is hereby certified that error appears in the printed specification of the above numbered patent requiring correction as follows: Page 2, second column, line 23, claim 3, for the words "closed spaced" read --closely spaced--; and that the said Letters Patent should be read with this correction therein that the same may conform to the record of the case in the Patent Office.

Signed and sealed this 27th day of February, A. D. 1945.

(Seal)

Leslie Frazer
Acting Commissioner of Patents.